(12) United States Patent
Eads

(10) Patent No.: US 6,411,955 B1
(45) Date of Patent: Jun. 25, 2002

(54) METHOD AND APPARATUS FOR PROVIDING SERVICE ANNOUNCEMENTS

(75) Inventor: James S. Eads, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/222,514

(22) Filed: Dec. 29, 1998

(51) Int. Cl.$^7$ .............................. G06F 17/30; H04Q 7/20
(52) U.S. Cl. ....................... 707/10; 707/200; 707/202; 707/204; 709/220; 709/226; 455/33.1; 455/443; 455/433
(58) Field of Search ................................. 709/220, 226; 370/100; 707/10, 200, 202, 204; 455/33.1, 443, 433

(56) References Cited

U.S. PATENT DOCUMENTS

| | | | | |
|---|---|---|---|---|
| 5,353,335 A | * | 10/1994 | D'Urso et al. ................. | 379/67 |
| 5,561,854 A | * | 10/1996 | Antic et al. .................. | 455/56.1 |
| 5,594,942 A | * | 1/1997 | Antic et al. .................. | 455/33.1 |
| 5,640,319 A | * | 6/1997 | Beuning et al. .............. | 364/131 |
| 5,729,592 A | * | 3/1998 | Frech et al. .................. | 379/67 |
| 5,912,961 A | * | 6/1999 | Taylor et al. ................. | 379/201 |
| 6,047,046 A | * | 4/2000 | Smets et al. ............. | 379/88.25 |
| 6,067,454 A | * | 5/2000 | Foti ............................ | 455/433 |
| 6,075,854 A | * | 6/2000 | Copley et al. ............... | 379/211 |
| 6,081,712 A | * | 6/2000 | Buettner ...................... | 455/433 |
| 6,233,458 B1 | * | 5/2001 | Haumont et al. ........... | 455/445 |

* cited by examiner

Primary Examiner—Frantz Coby
(74) Attorney, Agent, or Firm—Banner & Witcoff

(57) ABSTRACT

The present invention provides an improved technique to overcome the problems associated with a failed switch having service announcement capabilities. In one embodiment of the present invention, a copy of the complete service announcement set at a switch is provided in a database coupled to an announcement administration processing system (or an AAP) at a switch. In the event that a failure occurs with a memory device having stored therein the announcement set, the memory being part of an announcement controller or a Service Circuit Unit (SCU), the service announcement set residing within the AAP may be applied directly to the failed memory device, thereby avoiding the problems associated with techniques known in the art. Additionally, before a failed SCU is restored, the system compares the announcement sets in the restored memory device with a memory device at another SCU to ensure that there are no mismatches between the announcement sets. Advantageously the present invention provides a way to quickly restore failed switches without a requiring a labor-intensive procedure and ensures against mismatches of announcement sets between SCUs.

18 Claims, 3 Drawing Sheets

METHOD AND APPARATUS FOR PROVIDING SERVICE ANNOUNCEMENTS

BACKGROUND OF THE INVENTION

1. Technical Field

This invention relates to telecommunications services and, more particularly, to techniques for providing a service announcement system capable of quickly handling a service failure within a network switch.

2. Description of the Relevant Art

In recent years, an increasing number of businesses utilize service announcement systems to initially answer calls from their incoming callers. Service announcement systems have significantly developed in sophistication in large part due to the computerization of telecommunication systems. Service announcement systems first became available with the introduction of the #4 electronic switching system or the 4ESS switch. The 4ESS switch's announcement capabilities were originally designed primarily to signal a calling party about a call failure. The switch could connect 896 simultaneous callers to any of a small variety of call failure tones and announcements. The announcement set included 20 different, synchronized, 12-second announcements referred to as phased announcements.

Since the introduction of the 4ESS switch, many improvements have been made to the capabilities of service announcement systems. Improved hardware and software capabilities have allowed service announcement systems to handle more callers at the same time as well as exponentially increase the range of announcement messages that can be delivered to the calling part. Presently available service announcement systems are now capable of handling hundreds of thousands of calls each day and can deliver over 65,000 different announcements messages.

Service announcement systems are also now capable of collecting information from the calling parties, typically touch tone or spoken replies, to connect the caller to the appropriate line or to provide the caller with the appropriate service announcement. In addition, service announcement systems may be periodically updated (by the system as well as the service announcement customer) to provide more up-to-date announcement messages to the calling party. Further, service announcement systems are capable of providing faster connections to the service announcement messages. As a result of this increased capability, service announcement systems can now quickly deliver up-to-date announcement messages that are applicable to a broad range of purposes for the calling party. Service announcement systems also benefit the service announcement customer since incoming calls can be handled more efficiently through the service announcement system. In addition, service announcement systems can provide a wide variety of capabilities and features to accommodate the customer's specific business needs.

An announcement set, which contains the entire range of announcement messages, is typically stored in a pair of identical disks residing at a switch of the telephone network and more particularly within a local announcement controller and particularly a Service Circuit Unit (SCU) of the switch. Each switch typically has two or more announcement controllers or SCUs which provide connectivity to as many as 242 telephone trunks. The announcement set is stored in two disks to reduce the access time for retrieving the desired service announcement message. Such systems advantageously cat store large amounts of service announcement messages and can quickly retrieve the desired service announcement to be provided to the calling party.

Present service announcement systems, however, are limiting in the event that one of the SCUs containing the service announcement set fails. With a failed SCU, the service announcement system is inoperable to those trunks normally serviced by that SCU. Calling parties coupled to those trunks therefore cannot receive any service announcements during this time period. This is also problematic for the telephone company's customers who cannot effectively conduct business with their calling customers. The telephone company must devote many hours isolating or sectionalizing the failed site. Typically, an SCU goes down when a disk within the SCU containing the service announcement set fails. In order to repair the failure, the announcement set stored within the failed disk must be recopied. Recopying is a labor-intensive, time-consuming process. Typically under present systems, to restore the railed disk, a disk containing the announcement set from another SCU must be removed and re-copied onto the failed disk. During this time, both SCU's are out of operation. The second disk in the SCU may also be used to restore the failed disk, however, copying commands are complicated and susceptible to operator error. Accordingly, this approach is not favored. Alternatively, the announcement set is re-copied on a disk from a central site and delivered via courier to the site for copying, where the operator engages in a labor-intensive copying procedure. Another option is to download the announcement set over the communications line, however, this downloading process can take up to eight or nine hours.

In addition to the problem of restoring failed SCUs, there is the risk of mismatches in announcements between SCUs within the same switch and even SCUs of different switches. This risk is even more pronounced with service announcement systems now capable of continually updating its service announcement messages. This risk is also prevalent in the event that an SCU fails and it is hours before it is restored. During the period when an SCU is out of service the associated switch buffers any updates to the announcement set and updates the SCU's announcement set right before it is placed back in service. With this delay in providing updates to the SCU during a failure, there is a risk that the announcement updates may not properly be made. The undesirable result is that calling parties can receive inconsistent or incorrect announcement messages.

Audit checks may be performed to identify any mismatches between the announcement sets between two SCUs. Typically, the audit check compares the disks of SCUs residing at the same switch. This procedure, however, is limiting since the audit check is not performed during an SCU failure. Further, the audit check is not performed on a real-time basis but rather every eight seconds and for one announcement set. More significantly, the audit check does not provide any mechanism to correct for any mismatches. To correct any mismatches between announcement sets, the correct announcement sets must be re-copied onto the faulty SCUs, again a labor-intensive, time-consuming procedure.

SUMMARY OF THE INVENTION

The present invention provides an improved technique to overcome the problems associated with a failed switch having service announcement capabilities. In one embodiment of the present invention, a copy of the complete service announcement set at a switch is provided in a database coupled to an Announcement Administration Processor (AAP). In the event that a failure occurs with a memory device having stored therein the announcement set, the memory being part of an announcement controller or a Service Circuit Unit (SCU), the service announcement set residing within the AAP may be applied directly to the failed memory device, thereby avoiding the problems associated with techniques known in the art. Additionally. before a failed SCU is restored, the system compares the announcement sets in the restored memory device with a memory device at another SCU to ensure that there are no mismatches between the announcement sets. Advantageously, the present invention provides a way to quickly restore failed switches without requiring a labor-intensive procedure and ensures against mismatches of announcement sets between SCUs.

These as well as other novel advantages, details, embodiments, features and objects of the present invention will be apparent to those skilled in the art from following the detailed description of the invention, the attached claims and accompanying drawings, listed herein below, which are useful in explaining the invention.

BRIEF DESCRIPTION OF THE DRAWINGS

In the text which follows and in the drawings, wherein similar reference numerals denote similar elements throughout the several views thereof, the present invention is explained with reference to illustrative embodiments, in which.

DETAILED DESCRIPTION

For a better understanding of the present invention, reference may be had to the following detailed description taken in conjunction with the appended claims and accompanying drawings.

Figure 1:
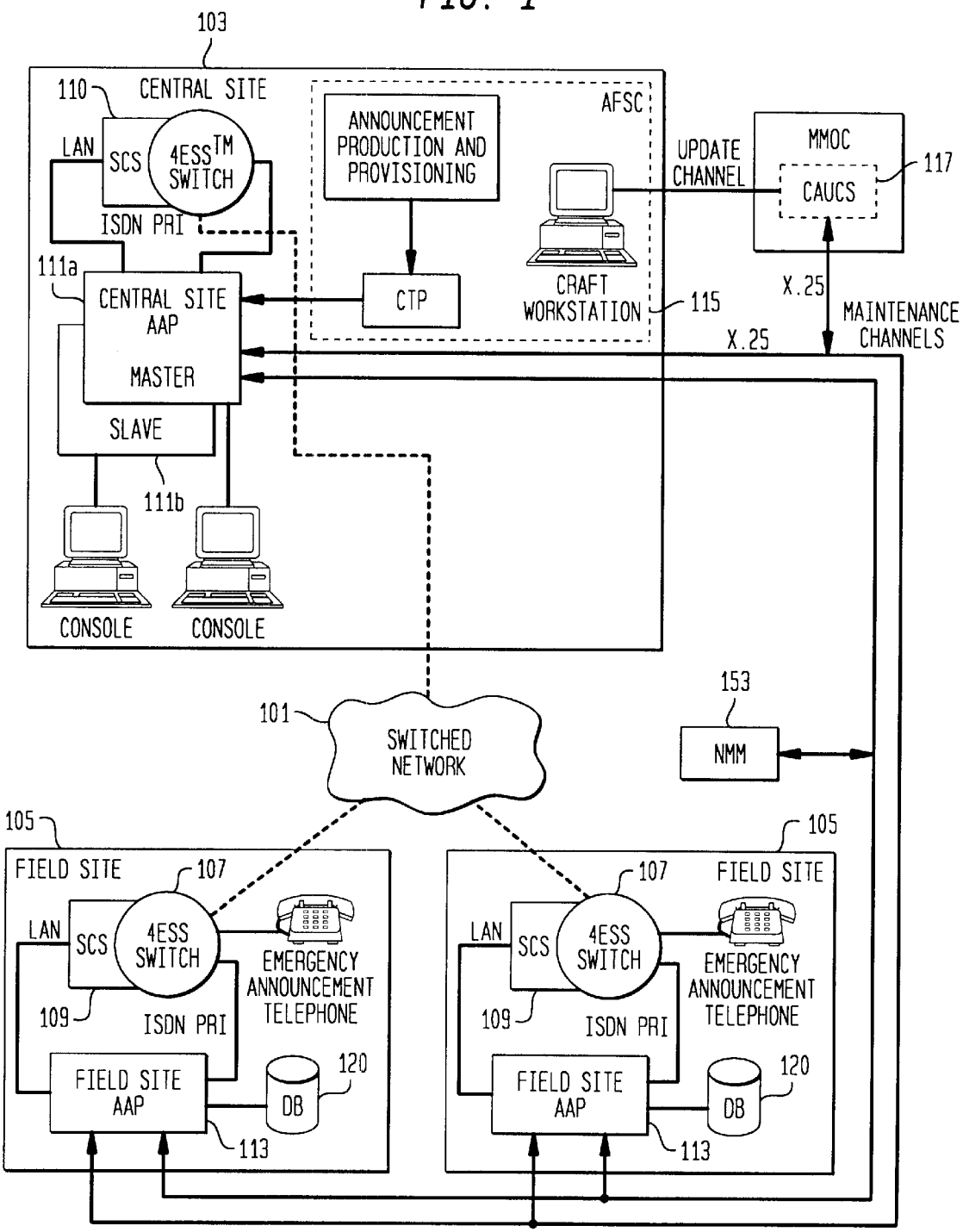
FIG. 1 is a schematic block diagram of a service announcement system in accordance with the present invention.

FIG. 1 depicts a schematic block diagram of a service announcement system in accordance with the present invention. The present invention is preferably a modified Improved Service Announcements and Information Collection (ISAIC) system which is a software, hardware and operational, administrative and maintenance (OA&M) procedures upgrade to the 4ESS switch's announcement system. Though described in this embodiment, those skilled within the art will appreciate that the present invention may be implemented within other telephone switching systems.

The service announcement system is generally implemented within a standard switched telephone network system 101 and more particularly within a central site 103 and one or more field sites 105. Field site 105 consists generally of a telephone network switch 107, such as a 4ESS switch, and one or more associated Service Circuit Systems (SCSs) 109 described in further detail herein. Switch 107 is coupled through a typical switched telephone network to other switches including those at other field sites 105 and that at central site 103. The service announcement system typically includes a central site Announcement Administration Processor (AAP) 111a and 111b at central site 103 and one or more field site AAPs 113 at field sites 105. Field site AAP 113 is generally a computing system coupled to switch 107 typically through an Integrated Services Digital Network (ISDN) Primary Rate Interface (PRI) interface and to SCS 109 through a Local Area Network (LAN) interface. Field site AAP 113 also couples to central site AAP 111, one or more other field site AAPs 113 and a Network Management Module 153 and a Centralize Announcement Update Control System (CAUCS) 117. Field site AAPs 113, central site AAP 111 and CAUCS 117 may be interconnected via a Wide Area Network (WAN) and preferably a T1 line. Advantageously. a T1 line allows the service announcement system to broadcast entire sets of service announcements in a timely fashion.

Central site 103 consists generally of central site AAP 111a and 111b an Advanced Feature Service Center (AFSC) 115, switch 107 and one or more central site SCSs 110. AFSC 115 provides control and maintenance interfaces to manage announcement activities from central site. For example, operators at AFSC 115 may update and maintain announcement sets. Central site AAP 111 provides central control for introducing new and/or updated announcements to each switch 107. Central site AAP 111 includes a master AAP 111a and a slave AAP 111b coupled to each other via a LAN. Master AAP 111a distributes announcement data, issues commands and indirectly controls slave AAP 111b. Slave AAP 111b provides the additional processor to control and simultaneously distribute announcements to all switches 107. Field site AAP 113 receives and stores announcements received from slave AAP 111b and performs announcement operations for the SCSs 109 that it supports. For instance, field site AAP 113 receives announcement updates from slave AAP 111b and applies the updates to the announcement sets residing at switch 107 (discussed herein). In accordance with the present invention, field site AAP 113 includes a database 120 having stored therein a copy of the complete announcement set. Database 120 is preferably resident locally at switch 107 within field site AAP. Alternatively, database 120 may be remotely located or shared by two or more switches 107. Database may be any mass memory device capable of storing a complete copy of the announcement set.

Central site AAP 111, field site AAPs 113. CAUCS 117 and AFSC 115 together serve to update announcement messages on all switches 107 from one central location. Updates to the announcement messages are broadcast from central site AAP 111 to each of the field site AAPs 113. CAUCS 117 provides centralized announcement update control for the announcement system. CAUCS 117 couples to field site AAPs 113 and central site AAP 111 via a maintenance interface link. CAUCS 117 also couples to central site AAP via 111 an update channel. The maintenance interface links and update channels preferably implement an X.25 protocol.

Figure 2:
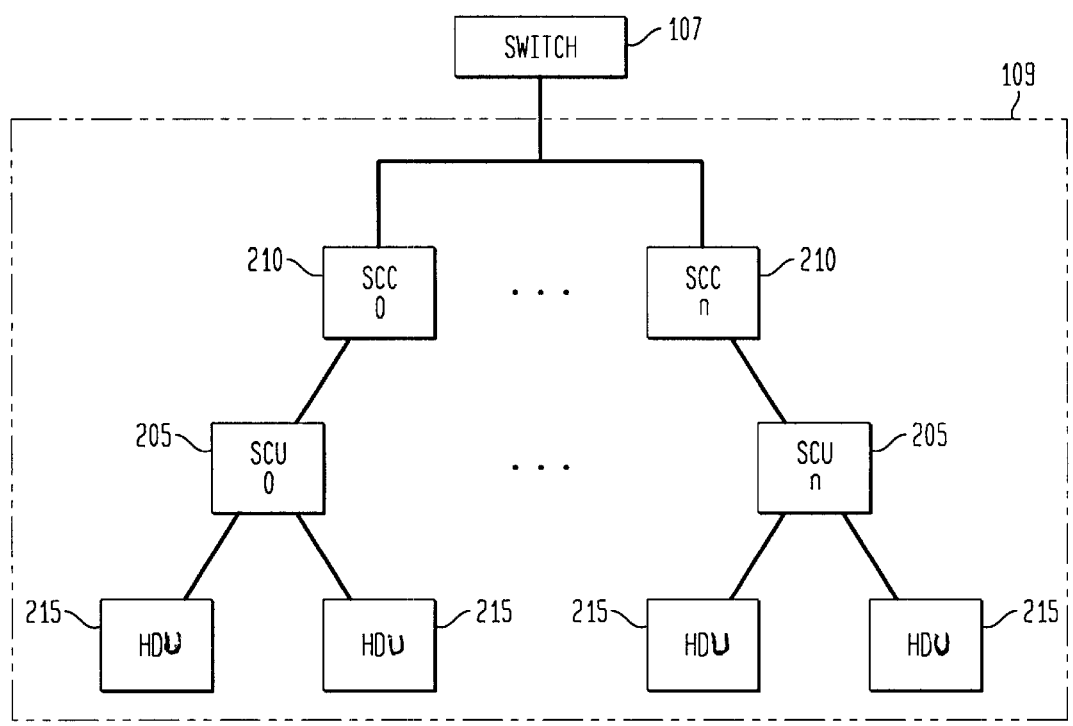
FIG. 2 is a schematic diagram depicting the physical layout of the hardware of SCS.

FIG. 2 is a schematic diagram depicting the physical layout of the hardware of SCS 109. The functions of SCS 109 at field sites 105 are playing service announcements for the calling party, detecting inputs from the calling party and retrieving and storing announcement updates. Each switch 107 may include as many as eight (8) SCSs 109. Each SCS 109 includes one or more announcement controllers or Service Circuit Units (SCUs) 205 and one or more Service Circuit Controllers (SCCs) 210. Each SCS 109 may include as many as 16 SCUs 205. SCU 205 plays announcements and queries the calling party for digits that need to be collected. SCC 210 serves as an interface between each SCU 205 and switch 107. The service announcement sets are stored in a memory device and, preferably, one or more Hard Disk Units (HDUs) 215 coupled to each SCU 205. HDU 215 may be any mass storage memory device capable of storing the service announcement set. Two or more HDUs 215 having a duplicate copy of the announcement set may be utilized to reduce the access time for retrieving desired service announcement (given the high number of calls that switch 107 may handle at any given time). When the announcement sets are updated, the copies in each HDU 215 are simultaneously updated.

In accordance with the present invention, database 120 residing within field site AAP 113 of FIG. 1 provides a backup copy of the announcement set such that if an HDU 215 experiences a failure, the backup copy of the announcement set in database 120 may be copied onto the failed HDU 215. As discussed above when HDU 215 fails, the associated SCU 205 must be taken out of service to repair failed HDU 215. Under known techniques, another SCU 205 having a properly working HDU 215 must be used to recopy the announcement set onto the failed HDU 215. Accordingly, this procedure requires two SCUs 205 to be taken out of service during a time-consuming, labor-intensive copying procedure during which the telephone line trunks associated with the two SCUs 205 may not access any service announcements. The alternative procedure known in the art is to download the announcement set from central site 103 which may take eight or more hours.

Advantageously, under the present invention, failed HDU 215 may be timely restored without requiring other SCUs 205 to be taken out of service. Failed HDU 215 may be restored by copying the announcement set stored in database 120 at field site 105 directly onto the failed HDU. 215. The labor-intensive, time-consuming, procedure under known techniques may be overcome by the present invention. As preferred, HDU 215 and AAP 111 are coupled via a LAN link coaxial cable.

Figure 3:
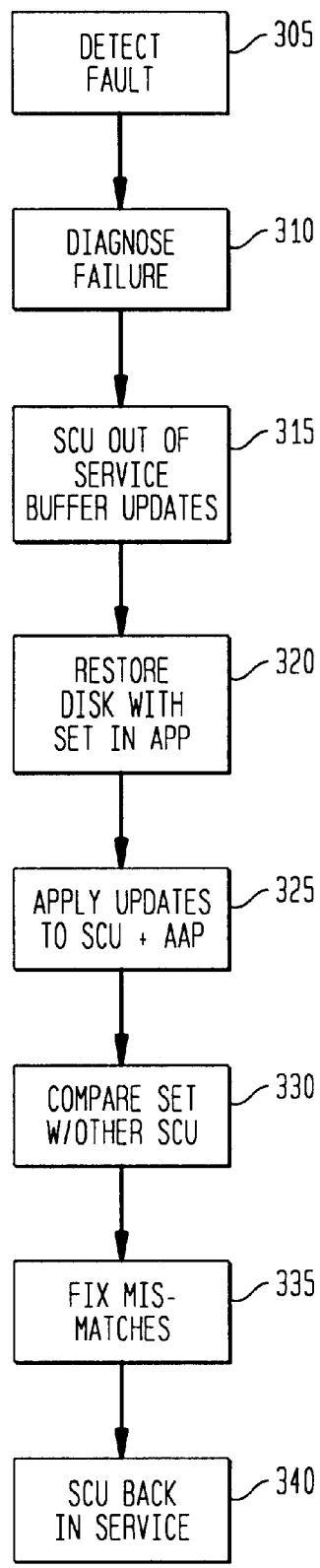
FIG. 3 is low chart describing the procedure for restoring a failed SCU in accordance with the present invention.

FIG. 3 is flow chart describing the procedure in accordance with the present invention for restoring a failed SCU 205 which may be a failed HDU 215 as well as other things. When a fault in a switch 107 is detected. the system implements a fault recovery system in accordance with the present invention. Examples of faults include, for example, hard drive failure, processor fault, disk trouble, LAN failure, and failed HDU 215. Under a preferred embodiment, when a fault at switch 107 is detected at step 305, the location of the fault must first be identified. At step 310, the system initiates a fault recovery procedure in the form of a software program resident in switch 107 to diagnose the source of the failure. At step 315, once the failed HDU 215 is identified, the associated SCU 205 is put out of service. During this time period that SCU 205 is out of service, any updates to the announcement set are suspended and buffered in field site AAP 113. Updates to the copy of the announcement set resident in database 120 are similarly suspended and buffered. At step 320, the failed HDU 215 is restored by recopying the announcement set resident in database 120 onto the now restored HDU 215. Advantageously over the prior art, no other SDUs 205 need to be taken out of service. In addition, since an extra copy of the announcement set is resident locally, the recopying procedure may be accomplished in a relatively shorter time period. Once the copying procedure is complete, announcement set updates being buffered are applied to the copy of the announcement set in database 120 and the restored HDU 215 (step 325).

Advantageously under the present invention, once the failed HDU 215 is restored and updated, at step 330, it is cross-checked with announcement sets in one or more other SCUs 205 to ensure that there are no inconsistent announcement messages. With announcement sets being frequently updated, there is a greater risk that there may inconsistent announcement messages at different SCUs 205. The risk of inconsistency is particularly present when a failed HDU 215 has just been restored. The present invention, thereby minimizes this risk by cross-checking the announcement sets. The system preferably compares announcement sets between SCUs 205 that are resident at the same switch 107 and alternatively, compares announcement sets of SCUs 205 at different switches. Cross-checks may be performed under techniques used in present system. Any incongruities or inconsistencies between the announcements are then identified and at step 335, these mismatches may be corrected by an operator at switch 107. Once the mismatches are identified and corrected. SCU 205 may be placed back into service at step 340.

The system of the present invention thereby provides a service announcement system that is capable of quickly restoring itself in the event of a fault in SCU 205 and also better ensures that announcement sets amongst the switches are free of inconsistencies or incongruities.

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. For example, the principles of the invention may be extended to providing service announcement updates for telecommunications related services such as Internet services, television/video conferencing services and the like. All such modifications, embodiments or variations of the invention are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

I claim:

1. In a communication switch implemented within a communications network, the switch having a first announcement controller coupled to a first memory having, stored therein a service announcement set, the switch also having an administration processor coupled to a database having stored therein a copy of the service announcement set, a method of restoring the first memory, the method comprising the steps of:

(a) detecting a failure in service due to failure of the first memory in the switch;

(b) copying the copy of the service announcement set from the database to the first memory;

(c) updating the copy of the service announcement set contained in the first memory and database with updates forming an updated service announcement set in the first memory and a copy of the update service announcement set in the database; and (d) comparing the updated service announcement set in the first memory with a second service announcement set stored in a second memory coupled to the switch via a second announcement controller.

2. In a communication switch implemented within a communications network, the switch having a first announcement controller coupled to a first memory having stored therein a service announcement set the switch also having an administration processor coupled to a database having stored therein a copy of the service announcement set, a method of restoring the first memory, the method comprising the steps of:

(a) detecting a failure in service due to failure of the first memory in the switch;

(b) copying the copy of the service announcement set from the database to the first memory;

(c) updating the copy of the service announcement set contained in the first memory and database with updates forming an updated service announcement set in the first memory and a copy of the update service announcement set in the database;

(d) comparing the updated service announcement set in the first memory with a second service announcement set stored in a second memory coupled to the switch via a second announcement controller; and (e) identifying and differences between the updated service announcement set and the second service announcement set.

3. In a communication switch implemented within a communications network, the switch having a first announcement controller coupled to a first memory having stored therein a service announcement set, the switch also having an administration processor coupled to a database having stored therein a copy of the service announcement set, a method of restoring the first memory, the method comprising the steps of:

(a) detecting a failure in service due to failure of the first memory in the switch;

(b) copying the copy of the service announcement set from the database to the first memory;

(c) updating the copy of the service announcement set contained in the first memory and database with updates forming an updated service announcement set in the first memory and a copy of the update service announcement set in the database;

(d) buffering any updates to the service announcement set;

(e) comparing the updated service announcement set in the first memory with a second service announcement set stored in a second memory coupled to the switch via a second announcement controller, and (f) identifying any differences between the updated service announcement set and the second service announcement set.

4. A communications switch implemented within a communications network capable of providing service announcement messages, the switch comprising:

(a) an administration processor having stored therein a master announcement set;

(b) at least one announcement controller coupled to the administration processor and operative to deliver service announcement messages to a calling party;

(c) at least one memory coupled to the announcement controller, the memory having stored therein a first service announcement set;

(d) means for copying the master announcement set onto the memory if a failure occurs with the memory.

5. A communications switch as claimed in claim 4, wherein the first administration processor includes a buffer to store at least one update to the master and first announcement sets and is operative to apply the update to the master and first announcement sets.

6. A communications switch as claimed in claim 4, wherein the switch is a 4ESS switch.

7. A communications switch implemented within a communications network capable of providing service announcement messages, the switch comprising:

(a) an administration processor having stored therein a master announcement set;

(b) at least one announcement controller coupled to the administration processor and operative to deliver service announcement messages to a calling party;

(c) at least one memory coupled to the announcement controller, the memory having stored therein a first service announcement set;

(d) means for copying the master announcement set onto the memory if a failure occurs with the memory;

(e) a second announcement controller coupled to the administration processor;

(f) a second memory coupled to the second announcement controller, the second memory having stored therein a second service announcement set; and (g) software operative to compare the first and second announcement sets for any mis-matches.

8. A service announcement system implemented within a communications network having at least two switches coupled to each others the service announcement system comprising:

(a) a first administration processor coupled to a first switch of the service announcement system;

(b) a first announcement controller coupled to the first administration processor;

(c) a First memory coupled to the first announcement controller having stored therein a first service announcement set;

(d) a first database coupled to the first administration processor having stored therein a master announcement set; and (e) means for downloading the master announcement set into the first memory in case of failure in the first memory.

9. A service announcement system of claim 8, wherein the first administration processor includes a buffer to store at least one update to the master and first announcement sets and is operative to apply the update to the master and first announcement sets.

10. A service announcement system as claimed in claim 8, wherein the first administration processor includes a buffer to store at least one update to the master and first announcement sets and is operative to apply the update to the master and first announcement sets.

11. A service announcement system of claim 10, further comprising:

(f) a central site coupled to the first and second switch and providing the at least one update.

12. A service announcement system as claimed in claim 8, wherein the second switch is also coupled to a second administration processor and a second announcement controller.

13. A service announcement system implemented within a communications network having at least two switches coupled to each other, the service announcement system comprising:

(a) a first administration processor coupled to a first switch of the service announcement system;

(b) a first announcement controller coupled to the first administration processor;

(c) a first memory coupled to the first announcement controller having stored therein a first service announcement set;

(d) a first database coupled to the first administration processor having stored therein a master announcement set;

(e) means for downloading the master announcement set into the first memory in case of failure in the first memory;

(f) a second switch coupled to a second memory having stored therein a second service announcement set; and (g) software operative to compare the first and second announcement sets and identity any mis-matches.

14. A service announcement system implemented within a communications network having at least two switches coupled to each other, the service announcement system comprising:

(a) a first administration processor coupled to a first switch of the service announcement system;

(b) a first announcement controller coupled to the first administration processor;

(c) First memory coupled to the first announcement controller having stored therein a first service announcement set;

(d) a first database coupled to the first administration processor having stored therein a master announcement set;

(e) means for downloading the master announcement set into the first memory in case of failure in the first memory;

(f) a second announcement controller coupled to the administration processor;

(g) a third memory coupled to the second announcement controller, the third memory having stored therein a third service announcement set; and (h) software operative to compare the first and third announcement sets and to identify any mis-matches.

15. A method of restoring a first memory coupled to a first announcement controller, the first memory containing a service announcement set for a communication switch, the method comprising the steps of:

(a) copying from an administration processor a copy of the service announcement set to the first memory;

(b) updating the copy of the service announcement set contained in the first memory with updates forming an updated service announcement set in the first memory and a copy of the updated service announcement set in the administration processor;

(d) comparing the updated service announcement set in the first memory with a second service announcement set stored in a second memory coupled to the switch via a second announcement controller; and (e) identifying differences between the updated service announcement set and the second service announcement set.

16. A communications network capable of providing service announcements messages, the network comprising:

(a) a switch;

(b) an administration processor coupled to the switch, the administration processor having stored therein a master announcement set;

(c) at least one announcement controller coupled to the administration processor and operative to deliver service announcement messages to a calling party;

(c) a first memory coupled to the announcement controller, the first memory having stored therein a first service announcement set;

(d) means for copying the master announcement set onto the first memory if a failure occurs within the first memory; and (e) means for comparing the copied master announcement set on the first memory with a second service announcement set stored in a second memory.

17. In a communication switch implemented within a communications network, the switch having a first announcement controller coupled to a first memory having stored therein a service announcement set, the switch also having an administration processor coupled to a database having stored therein a copy of the service announcement set, a method of restoring the first memory the method comprising the steps of:

(a) detecting a failure in service due to failure of the first memory in the switch;

(b) copying the copy of the service announcement set from the database to the first memory;

(c) updating the copy of the service announcement set contained in the first memory and database with updates forming an updated service announcement set in the first memory and a copy of the update service announcement set in the database; and (d) identifying differences between the updated service announcement set and a second service announcement set stored in a second memory.

18. A communications network capable of providing service announcements messages, the network comprising;

(a) a switch;

(b) an administration processor coupled to the switch, the administration processor having stored therein a master announcement set;

(c) at least one announcement controller coupled to the administration processor and operative to deliver service announcement messages to a calling party;

(c) a first memory coupled to the announcement controller, the first memory having stored therein a first service announcement set;

(d) means for copying the master announcement set onto the first memory if a failure occurs within the first memory; and (e) means for identifying differences between the copied master announcement set of the first memory with a second service announcement set stored in a second memory.

* * * * *